United States Patent
Jadhao (10) Patent No.: US 12,310,292 B2
(45) Date of Patent: May 27, 2025

(54) SQUARE BALER IMPLEMENT WITH TWINE MONITORING SYSTEM

(71) Applicant: DEERE & COMPANY, Moline, IL (US)

(72) Inventor: Umesh B. Jadhao, Ottumwa, IA (US)

(73) Assignee: Deere & Company, Moline, IL (US)

( * ) Notice: Subject to any disclaimer, the term of this patent is extended or adjusted under 35 U.S.C. 154(b) by 765 days.

(21) Appl. No.: 17/652,341

(22) Filed: Feb. 24, 2022

(65) Prior Publication Data

US 2023/0263099 A1  Aug. 24, 2023

(51) Int. Cl.
*A01F 15/14* (2006.01)
*A01F 15/08* (2006.01)
*A01F 15/12* (2006.01)

(52) U.S. Cl.
CPC .......... *A01F 15/148* (2013.01); *A01F 15/145* (2013.01)

(58) Field of Classification Search
CPC ...... A01F 15/148; A01F 15/145; A01F 15/08; A01F 15/0833; A01F 15/12; A01F 15/14
See application file for complete search history.

(56) References Cited

U.S. PATENT DOCUMENTS

| | | | |
|---|---|---|---|
| 7,295,895 B2 | 11/2007 | Smith et al. | |
| 8,141,480 B2 * | 3/2012 | Smith | A01F 15/0715 53/64 |
| 2015/0373918 A1 * | 12/2015 | Coen | A01F 15/145 56/443 |
| 2017/0287303 A1 * | 10/2017 | Lang | G08B 21/0275 |

FOREIGN PATENT DOCUMENTS

CN    111238338 A  *  6/2020  ............. A01F 15/07

OTHER PUBLICATIONS

English translate (CN111238338A), retrieved date Feb. 2, 2025.*

\* cited by examiner

*Primary Examiner* — Mohammed S. Alawadi (57) ABSTRACT

A baler implement includes a housing defining a baling chamber for forming a bale having a parallelepiped shape, and a knotter system for wrapping and tying twine around the bale. A knotter controller is configured to determine a remaining length of a first twine in a first twine supply, and determine a remaining length of a second twine in a second twine supply. The knotter controller may then calculate an estimated remaining number of bales that may be secured based on the remaining length of the first twine and the second twine. The knotter controller may communicate an output signal to an output device indicating the estimated remaining number of bales that may be secured. The knotter controller may automatically communicate a resupply request when the first twine and/or the second twine are low.

20 Claims, 6 Drawing Sheets

SQUARE BALER IMPLEMENT WITH TWINE MONITORING SYSTEM

TECHNICAL FIELD

The disclosure generally relates to a baler implement a method of controlling the baler implement.

BACKGROUND

One implementation of a baler implement is configured to form material into a bale having a parallelepiped shape, i.e., a rectangular shape. Such an implementation may be referred to as a square baler or a large square baler. The baler implement may include a knotter system that wraps and ties a twine around a perimeter of the bale to secure the shape of the bale. The twine is drawn from a twine supply. The twine supply may include multiple balls of twine connected together in series. When the twine supply is exhausted, the twine supply must be replenished before further bales may be formed and bound.

SUMMARY

A baler implement is provided. The baler implement includes a housing defining a baling chamber. The baling chamber is shaped to form a material into a bale having a parallelepiped shape. The parallelepiped shape of the bale includes a length along a longitudinal axis of the bale, a width perpendicular to the bale and arranged substantially on a horizontal plane, and a height orthogonal to the length and the width and extending generally vertically. The baler implement includes a knotter system. The knotter system includes a first twine supply having a first twine, and a second twine supply having a second twine. The knotter system further includes a knotter that is configured to receive the first twine from the first twine supply and receive the second twine from the second twine supply. The knotter is operable to tie the first twine and the second twine together to form a knot. A knotter controller includes a processor and a memory having a twine monitoring algorithm stored thereon. The processor is operable to execute the twine monitoring algorithm to determine a remaining length of the first twine in the first twine supply, and determine a remaining length of the second twine in the second twine supply. The knotter controller may then calculate an estimated remaining number of bales that may be secured based on the remaining length of the first twine and the remaining length of the second twine. The knotter controller may communicate an output signal to an output device. The output signal indicates the estimated remaining number of bales that may be secured.

In one aspect of the disclosure, the baler implement includes a bale length sensor. The bale length sensor is operable to generate a length signal indicating the length of the bale. The bale length sensor may include, but is not limited to, a star wheel or an optical sensor or camera.

In one implementation, the processor is operable to execute the twine monitoring algorithm to determine the remaining length of the first twine in the first twine supply based on the length signal from the bale length sensor. The knotter controller may further determine the remaining length of the second twine in the second twine supply based on the length signal from the bale length sensor. Because the height and width of the baling chamber is generally fixed in size, the only variable in the size or volume of the bale is the length. By measuring and/or otherwise sensing the length of each respective bale, the knotter controller may determine the length of twine, both the length of the first twine and the length of the second twine, required to bind each respective bale.

In one aspect of the disclosure, the processor may be operable to execute the twine monitoring algorithm to estimate a used length of the first twine based on the length of the bale. The knotter controller may then subtract the used length of the first twine from an initial length of the first twine to determine the remaining length of the first twine in the first twine supply. The initial length of the first twine may be defined to include the remaining length of the first twine subsequent to the previous bale tied. Similarly, the processor may be operable to execute the twine monitoring algorithm to estimate a used length of the second twine based on the length of the bale. The knotter controller may then subtract the used length of the second twine from an initial length of the second twine to determine the remaining length of the second twine in the second twine supply. The initial length of the second twine may be defined to include the remaining length of the second twine subsequent to the previous bale tied.

In one aspect of the disclosure, the knotter system may use a first length of the first twine and a second length of the second twine to secure the bale. The first length is different than the second length. In one implementation of the disclosure, the first twine is positioned adjacent an upper longitudinal side of the bale for the length of the bale. The second twine is positioned adjacent a rearward end of the bale for the height of the bale, a lower longitudinal side of the bale for the length of the bale, and a forward end of the bale for the height of the bale. For each respective bale, the knotter system may be configured to tie a first knot at the intersection of the upper longitudinal side and the rearward end of the bale, and a second knot at the upper longitudinal side and the forward end of the bale.

In one implementation of the disclosure, the processor may be operable to execute the twine monitoring algorithm to automatically communicate a resupply request. The knotter controller may communicate the resupply request when one of the remaining length of the first twine in the first twine supply is less than a first supply threshold, the remaining length of the second twine in the second twine supply is less than a second supply threshold, or the estimated remaining number of bales is less than a pre-defined bale threshold. In one implementation, the resupply request may be communicated to a local operator of the baler implement. In another implementation of the disclosure, the resupply request may be communicated to a system manager at a location remote from the baler implement, thereby facilitating autonomous operation of the baler implement. The knotter controller may automatically communicate the resupply request without the need of an operator physically checking the quantity of the first twine supply and/or the second twine supply. By automatically communicating the resupply request, the first twine supply and/or the second twine supply may be replenished before exhaustion, thereby preventing unnecessary downtime of the baler implement.

In one aspect of the disclosure, the processor may be operable to execute the twine monitoring algorithm to determine the remaining length of the first twine in the first twine supply based on a knot length of the first twine used per knot tied. Similarly, the processor may be operable to execute the twine monitoring algorithm to determine the remaining length of the second twine in the second twine supply based on a knot length of the second twine used per knot tied. As described above, each respective bale includes a first knot and a second knot. Each of the first knot and the second knot require a knot length of the first twine and a knot length of the second twine. The knotter controller account for the knot length of the first twine and a knot length of the second twine, and use these lengths in determining the remaining length of the first twine and the remaining length of the second twine.

A method of controlling a baler implement is also provided. The method includes forming a bale in a baling chamber of the baler implement to include a parallelepiped shape having a length, a width, and a height. A twine loop is then wrapped around the bale with a knotter system to secure the bale. The knotter system includes a first twine supply having a first twine and a second twine supply having a second twine. The knotter system includes a knotter that ties the first twine and the second twine together to form a first knot. The knotter system is further configured to tie the first twine and the second twine together to form a second knot thereby forming the twine loop around the bale. A remaining length of the first twine in the first twine supply is determined based on a length of the bale. A remaining length of the second twine in the second twine supply is determined based on the length of the bale. An estimated remaining number of bales that may be secured is then calculated based on the remaining length of the first twine and the remaining length of the second twine. An output signal may then be communicated to an output device. The output signal indicates the estimated remaining number of bales that may be secured.

In one aspect of the disclosure, the baler implement includes a bale length sensor positioned to sense the length of the bale. The method described herein further comprises sensing the length of the bale with the bale length sensor. The bale length sensor is operable to generate a length signal indicating the length of the bale.

In one implementation of the disclosure, the method described herein further includes automatically communicating a resupply request. The resupply request may be communicated when one of the remaining length of the first twine in the first twine supply is less than a first supply threshold, the remaining length of the second twine in the second twine supply is less than a second supply threshold, or the estimated remaining number of bales is less than a pre-defined bale threshold. The resupply request is a communication requesting that at lease one of the first twine supply or the second twine supply be replenished.

In one aspect of the method described herein, the resupply request may be automatically communicated to a system manager at a location remote from the baler implement. The location may include, but is not limited to, a system manager connected to the knotter controller via a cloud-based communication system or the like. The method described herein may automatically determine the status of the first twine supply and the second twine supply, and then automatically communicate the resupply request, thereby eliminating the need for an operator to visually inspect the status of the first twine supply and the second twine supply.

In one aspect of the disclosure, the first twine is positioned adjacent the upper longitudinal side of the bale for the length of the bale. The second twine is positioned adjacent the rearward end of the bale for the height of the bale, the lower longitudinal side of the bale for the length of the bale, and the forward end of the bale for the height of the bale. The step of determining the remaining length of the second twine in the second twine supply based on the length of the bale may further be defined as determining the remaining length of the second twine in the second twine supply based on the length of the bale and the height of the bale.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a baler implement 20 is generally shown at 20 Referring to the Figures, the example implementation of the baler implement 20 is shown as a square baler implement, e.g., a large square baler.

Figure 1:
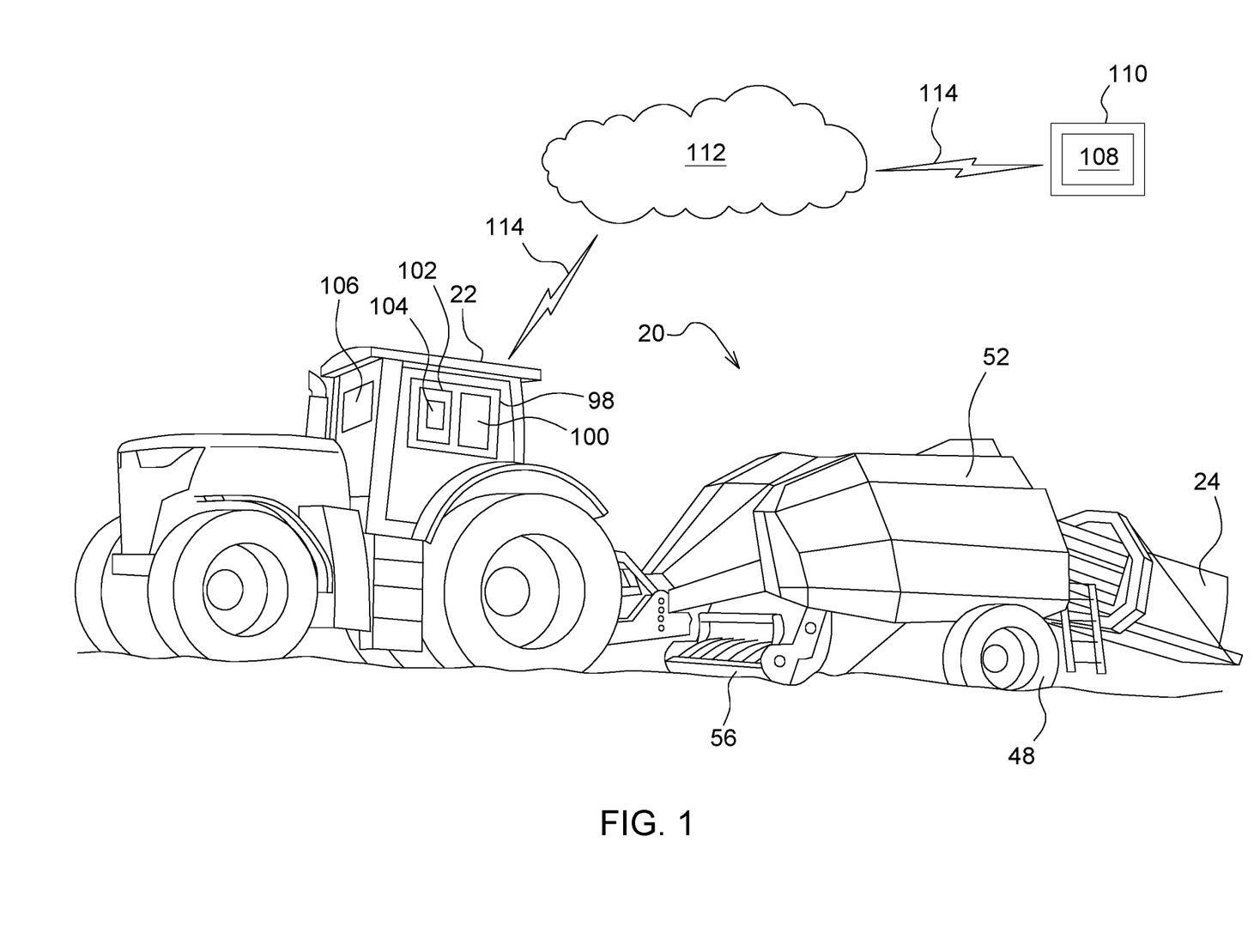
FIG. 1 is a schematic perspective view of a baler implement drawn by a traction unit.

As shown in FIG. 1, a traction unit 22 or vehicle, such as but not limited to a tractor, is coupled to the baler implement 20 for pulling and powering the baler implement 20. However, it should be appreciated that in other embodiments, the baler implement 20 may be self-propelled, in which case the traction unit 22 and the baler implement 20 are configured as a single, self-propelled vehicle.

The baler implement 20 may be moved across a field to gather and process crop material and form the crop material into a bale 24. The baler implement 20 may then eject the formed bale 24 from the rear of the baler implement 20. In the example implementation shown in the figures and described herein, a completed bale 24 is pushed off a rearward end of the baler implement 20 by a subsequently formed bale 24, or otherwise discharged off the rearward end of the baler implement 20 by a powered roller or some other discharge mechanism, whereby the bale 24 may be deposited on a trader or a ground surface.

In the example implementation shown in the Figures and described herein, the baler implement 20 forms the bale 24 to include a parallelepiped shape, i.e., a rectangular shape.

Figure 3:
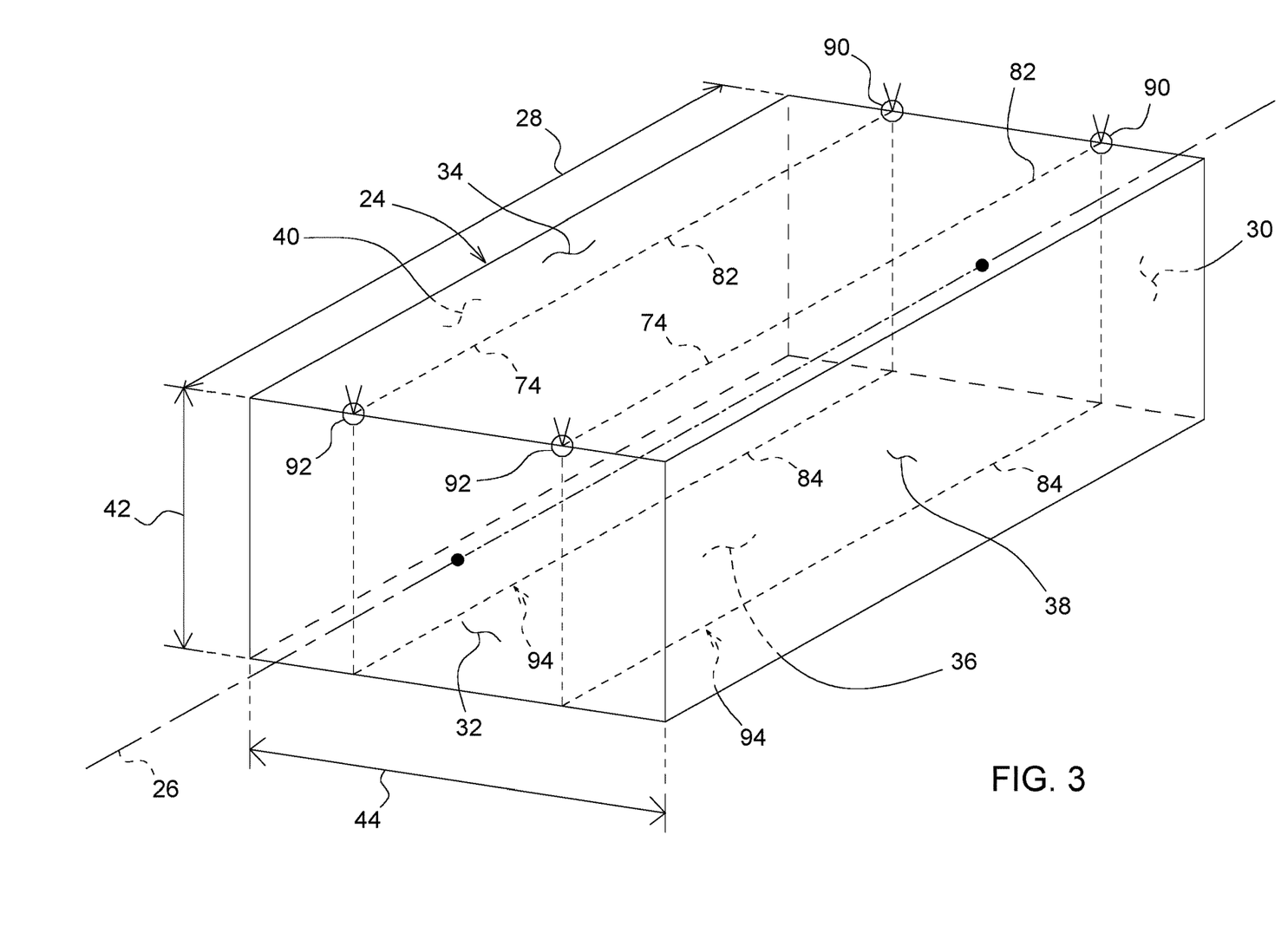
FIG. 3 is a schematic perspective view of a bale having a parallelepiped shape.
Figure 4:
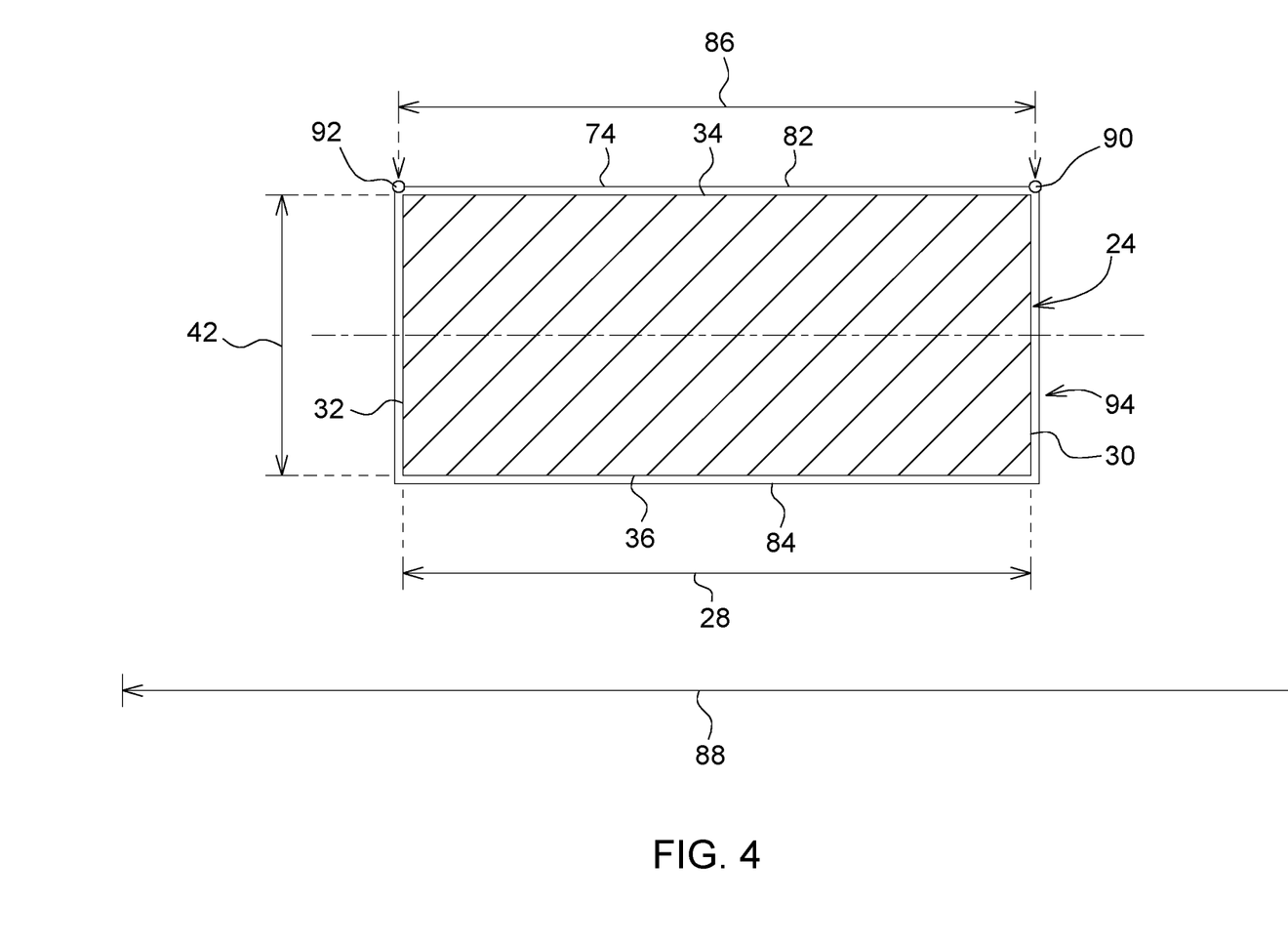
FIG. 4 is a schematic side view of the bale.

Referring to FIGS. 3 and 4, the parallelepiped shape extends along a central longitudinal axis 26 a bale length 28 between a rearward end 30 of the bale 24 and a forward end 32 of the bale 24. The parallelepiped shape includes an upper longitudinal side 34, a lower longitudinal side 36, a first lateral side 38, and a second lateral side 40, all of which extend along the bale length 28 of the bale 24 between the forward end 32 and the rear ward end of the bale 24. The parallelepiped shape includes a bale height 42 extending generally vertically between the lower longitudinal side 36 and the upper longitudinal side 34. The parallelepiped shape includes a bale width 44 extending generally horizontally between the first lateral side 38 and the second lateral side 40 of the bale 24. The bale length 28 extends generally horizontally between the forward end 32 and the rearward end 30 of the bale 24.

Figure 2:
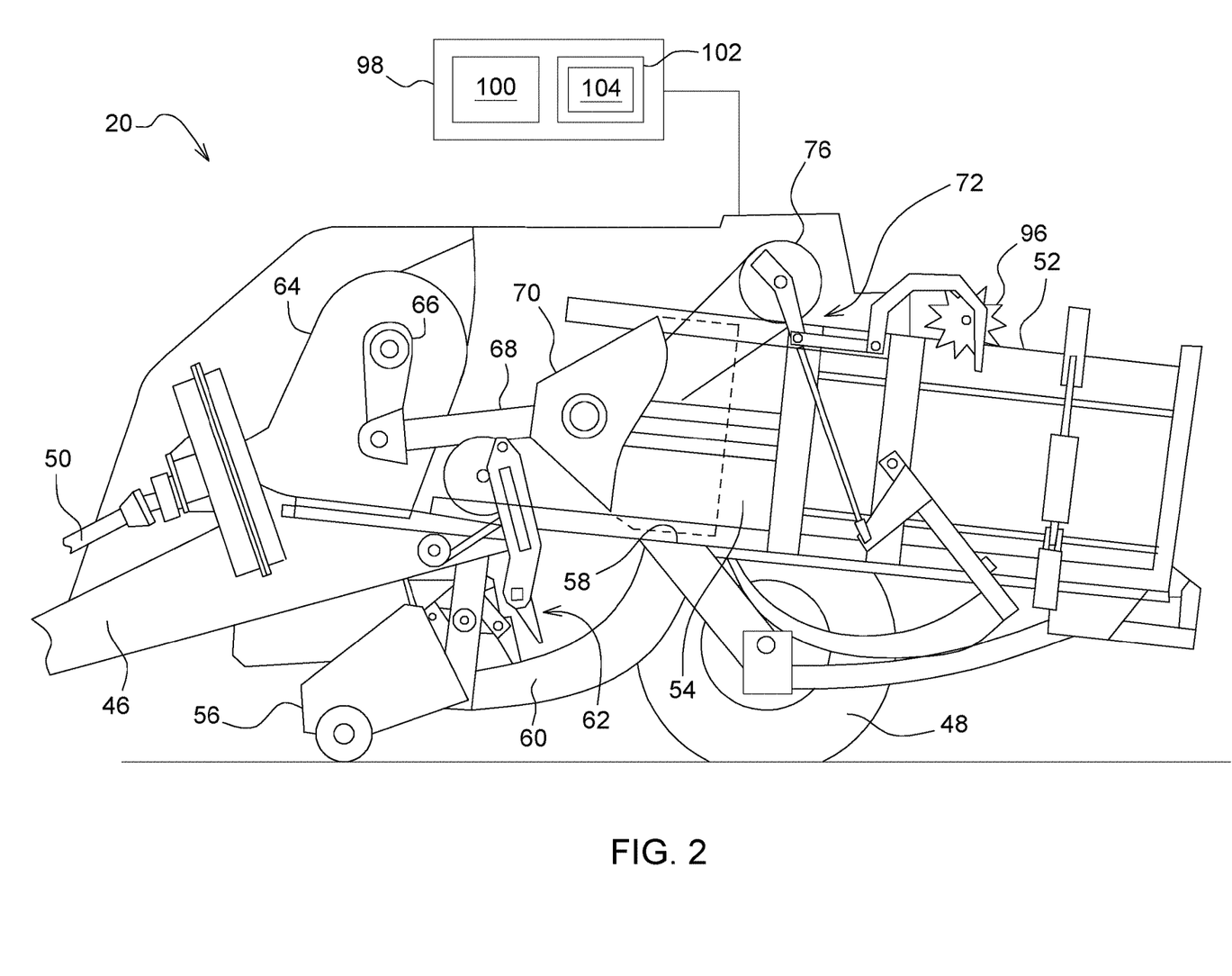
FIG. 2 is a schematic cross-sectional view of the baler implement.

Referring to FIG. 2, the exemplary embodiment of the baler implement 20 includes a frame 46, ground engaging devices 48, such as but not limited to wheels, and an input shaft 50, such as a power-take-off (PTO) shaft, which can receive rotational power from a power source, such as the tractor.

The baler implement 20 includes a housing 52 or body, which generally shields various internal components of the baler implement 20. The housing 52 is attached to and supported by the frame 46. The housing 52 includes multiple wall sections or panels that form and/or define a baling chamber 54 for forming the bale 24 into the parallelepiped shape. The baling chamber 54 may alternatively be referred to as a compression chamber.

The baler implement 20 may include a pick-up mechanism 56. The pick-up mechanism 56 is disposed proximate the forward end of the frame 46. The pick-up mechanism 56 gathers crop material from the ground surface and directs the gathered crop material toward and into an inlet 58 of the baling chamber 54. The pickup may include, but is not limited to tines, forks, augers, conveyors, baffles, etc., for gathering and moving the crop material. The pick-up mechanism 56 directs the gathered crop material into a pre-compression passageway 60, which stores a volume of gathered crop material. A feeder system 62, which may include a plurality of forks, are timed to move the crop material from the pre-compression passageway 60 into the baling chamber 54.

The input shaft 50 or PTO shaft is connected to an input of a transmission 64 to provide rotational power to the baler implement 20 from the tractor or other associated vehicle or power source. The transmission 64 includes a gearbox which converts the rotational motion of the input shaft 50 along a generally longitudinal axis of the baler implement 20 to an output of the transmission 64 having a rotational motion along a generally transverse axis of the baler implement 20.

The baler implement 20 includes a crank arm 66 connected to the output of the transmission 64. A connecting link 68 interconnects the crank arm 66 and a plunger 70. The crank arm 66 rotates based upon the output of the transmission 64 and the plunger 70 moves in a reciprocal motion within the baling chamber 54 as the crank arm 66 rotates. The plunger 70 extends into the baling chamber 54, thereby compressing the crop material, and then at least partially retracts from the baling chamber 54, at which time the feeder moves more crop material into the baling chamber 54.

Referring to FIGS. 3 and 4, when the bale 24 is formed within the baling chamber 54, a knotter system 72 wraps a plurality of twine strands 74 around the bale 24 to secure the shape of the bale 24. When the baler implement 20 is configured as the large square baler, such as described herein, the knotter system 72 wraps the twine around a longitudinal extend or longest length of the bale 24, with each individual twine strand 74 encircling the bale 24. The knotter system 72 ties each end of the twine of each respective twine strand 74 together to form a knot, securing each respective twine strand 74 in place.

Figure 5:
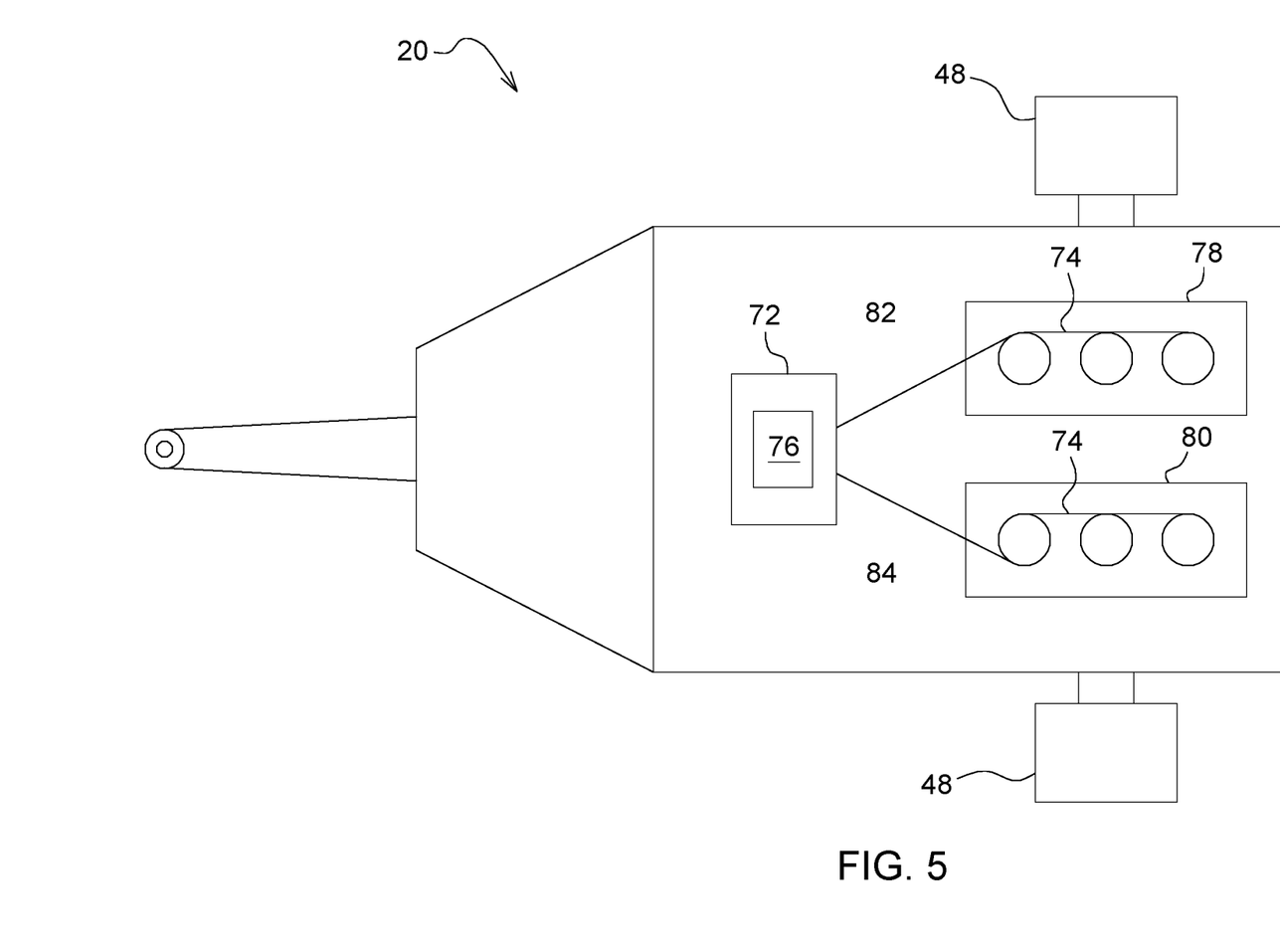
FIG. 5 is a schematic top plan view of the baler implement showing a knotter system.

Referring to FIG. 5, the knotter system 72 includes a knotter 76, a first twine supply 78 having a first twine 82, and a second twine supply 80 having a second twine 84. The knotter 76 is operable to receive the first twine 82 from the first twine supply 78 and the second twine 84 from the second twine supply 80 and tie the first twine 82 and the second twine 84 together to form a knot. The features and operation of the knotter system 72, including the knotter 76, are understood by those skilled in the art, and are therefore not described in greater detail herein.

Referring to FIG. 4, the knotter system 72 uses a first length 86 of the first twine 82 and a second length 88 of the second twine 84 to secure each respective bale 24. The first length 86 of the first twine 82 may be different than the second length 88 of the second twine 84. In the example implementation described herein, the first twine 82 is positioned adjacent the upper longitudinal side 34 of the bale 24 for the bale length 28 of the bale 24. The second twine 84 is positioned adjacent the rearward end 30 of the bale 24 for the bale height 42 of the bale 24, the lower longitudinal side 36 of the bale 24 for the bale length 28 of the bale 24, and the forward end 32 of the bale 24 for the bale height 42 of the bale 24. The knotter 76 ties a first knot 90 between the first twine 82 and the second twine 84 at the intersection of the upper longitudinal side 34 of the bale 24 and the rearward end 30 of the bale 24. The knotter 76 ties a second knot 92 between the first twine 82 and the second twine 84 at the intersection of the upper longitudinal side 34 of the bale 24 and the forward end 32 of the bale 24. Once the first knot 90 and the second knot 92 are tied, the first twine 82 and the second twine 84 form a twine loop 94 around the bale 24.

Referring to FIG. 2, the baler implement 20 may further include a bale length sensor 96. The bale length sensor 96 is operable to generate a length signal indicating the bale length 28 of the bale 24. The length signal may include, but is not limited to, movement of a mechanical component, an electronic signal, a broadcast signal, etc. In one implementation, the bale length sensor 96 may be configured to generate the length signal in response to the bale 24 obtaining a pre-defined length. In another implementation, the bale length sensor 96 may be configured to continuously or periodically generate the length signal providing a current length of the bale 24.

The baler implement 20 further includes a knotter controller 98. The knotter controller 98 may be disposed in communication with the knotter system 72 and/or the bale length sensor 96. The knotter controller 98 is operable to receive the length signal from the bale length sensor 96, and generate and communicate an output signal and/or a resupply request. While the knotter controller 98 is generally described herein as a singular device, it should be appreciated that the knotter controller 98 may include multiple devices linked together to share and/or communicate information therebetween. Furthermore, it should be appreciated that the knotter controller 98 may be located on the baler implement 20 or located remotely from the baler implement 20.

The knotter controller 98 may alternatively be referred to as a computing device, a computer, a controller, a control unit, a control module, a module, etc. The knotter controller

98 includes a processor 100, a memory 102, and all software, hardware, algorithms, connections, sensors, etc., necessary to manage and control the process described herein. As such, a method may be embodied as a program or algorithm operable on the knotter controller 98. It should be appreciated that the knotter controller 98 may include any device capable of analyzing data from various sensors, comparing data, making decisions, and executing the required tasks.

As used herein, "knotter controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the knotter controller 98 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The knotter controller 98 may be in communication with other components on the baler implement 20, such as hydraulic components, electrical components, and operator inputs within an operator station of an associated work vehicle. The knotter controller 98 may be electrically connected to these other components by a wiring harness such that messages, commands, and electrical power may be transmitted between the knotter controller 98 and the other components. Although the knotter controller 98 is referenced in the singular, in alternative embodiments the configuration and functionality described herein can be split across multiple devices using techniques known to a person of ordinary skill in the art.

The knotter controller 98 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 102 may include any non-transitory/tangible medium which participates in providing data or computer-readable instructions. The memory 102 may be non-volatile or volatile. Non-volatile media may include, for example, optical or magnetic disks and other persistent memory. Example volatile media may include dynamic random access memory (DRAM), which may constitute a main memory. Other examples of embodiments for memory 102 include a floppy, flexible disk, or hard disk, magnetic tape or other magnetic medium, a CD-ROM, DVD, and/or any other optical medium, as well as other possible memory devices such as flash memory.

The knotter controller 98 includes the tangible, non-transitory memory 102 on which are recorded computer-executable instructions, including a twine monitoring algorithm 104. The processor 100 of the knotter controller 98 is configured for executing the twine monitoring algorithm 104. The twine monitoring algorithm 104 implements a method of controlling the baler implement 20, and more particularly the knotter system 72, described in detail below.

The method of controlling the baler implement 20 includes determining an initial length of the first twine 82 of the first twine supply 78 and an initial length of the second twine 84 of the second twine supply 80. The step of determining the initial length of the first twine 82 and the initial length of the second twine 84 is generally indicated by box 140 shown in FIG. 6. In one implementation, the initial length of the first twine 82 and/or the second twine 84 may be determined automatically by the knotter controller 98. For example, the knotter controller 98 may sense a tag, e.g., an RFID tag, including information from a ball of twine loaded into one of the first twine supply 78 or the second twine supply 80. The information contained on the tag may indicate the initial length of the first twine 82 or the initial length of the second twine 84. The knotter controller 98 may then save the initial length of the first twine 82 and/or the second twine 84 in the memory 102 of the controller for further reference and use. In another implementation, an operator may input the initial length of the first twine 82 and the initial length of the second twine 84 into the knotter controller 98. The knotter controller 98 may then save the values input by the operator in the memory 102 of the controller for further reference and use. It should be appreciated that the initial length of the first twine 82 and the initial length of the second twine 84 may be determined in some other manner not described herein.

A bale 24 may then be formed in the baling chamber 54 of the baler implement 20. The step of forming the bale 24 is generally indicated by box 142 shown in FIG. 6. As described above, the bale 24 is formed to include the parallelepiped shape having the bale length 28, the bale width 44, and the bale height 42 described above. As understood by those skilled in the art, when forming a bale 24 having a parallelepiped shape, the bale width 44 and the bale height 42 are generally fixed by the cross sectional dimensions of the baling chamber 54. However, the bale length 28 of the bale 24 may be varied and/or selected.

Once the bale 24 is formed, the knotter system 72 wraps a twine loop 94 around the bale 24 to secure the bale 24. The step of wrapping the twine loop 94 around the bale 24 is generally indicated by box 144 shown in FIG. 6. As is understood by those skilled in the art, the knotter system 72 may wrap multiple twine loops 94 around the bale 24, with each twine loop 94 spaced apart from each other along the bale width 44 of the bale 24. For conciseness, only one twine loop 94 is described in greater detail herein. The twine loop 94 includes the first knot 90 connecting the first twine 82 and the second twine 84 and disposed at the intersection of the upper longitudinal side 34 and the rearward end 30 of the bale 24, and the second knot 92 connecting the first twine 82 and the second twine 84 and disposed at the intersection of the upper longitudinal side 34 and the forward end 32 of the bale 24. The first twine 82 extends along the upper longitudinal side 34 of the bale 24 between the first knot 90 and the second knot 92. The second twine 84 extends along the rearward end 30, the lower longitudinal side 36, and the forward end 32 of the bale 24 between the first knot 90 and the second knot 92.

The knotter controller 98 may then estimate a used length of the first twine 82 based on the bale length 28 of the bale 24. The step of estimating the used length of the first twine 82 and the used length of the second twine 84 is generally indicated by box 146 shown in FIG. 6. In one implementation, the bale length 28 of the bale 24 may be sensed by the bale length sensor 96 and communicated to the knotter controller 98 via the length signal. In another implementation, the bale length 28 of the bale 24 may include a pre-defined value saved in the memory 102 of the knotter controller 98. The amount or length of the first twine 82 used per each bale 24 is dependent upon the bale length 28 of the bale 24 and a knot length of the first twine 82 used in each of the first knot 90 and the second knot 92 respectively. The knot length is generally a constant length of the first twine 82, and may be defined and saved in the memory 102 of the controller. The used length of the first twine 82 may therefore be equal to the sum of the bale length 28 of the bale 24, the knot length of the first twine 82 of the first knot 90, and the knot length of the first twine 82 of the second knot 92.

Once the knotter controller 98 has estimated the used length of the first twine 82, as described above, the knotter controller 98 may then determine a remaining length of the first twine 82 in the first twine supply 78. The step of determining the remaining length of the first twine 82 and the second twine 84 is generally indicated by box 148 shown in FIG. 6. For example, the knotter controller 98 may subtract the used length of the first twine 82 from the initial length of the first twine 82 to determine the remaining length of the first twine 82 in the first twine supply 78. Because the used length of the first twine 82 is dependent upon the bale length 28 of the bale 24, the knot length of the first twine 82 in the first knot 90, and the knot length of the first twine 82 in the second knot 92, it should be appreciated that the remaining length of the first twine 82 is determined based on the bale length 28 of the bale 24, the knot length of the first twine 82 in the first knot 90, and the knot length of the first twine 82 in the second knot 92.

The knotter controller 98 may then estimate a used length of the second twine 84 based on the bale length 28 of the bale 24. The step of estimating the used length of the first twine 82 and the used length of the second twine 84 is generally indicated by box 146 shown in FIG. 6. In one implementation, the bale length 28 of the bale 24 may be sensed by the bale length sensor 96 and communicated to the knotter controller 98 via the length signal. In another implementation, the bale length 28 of the bale 24 may include a pre-defined value saved in the memory 102 of the knotter controller 98. The amount or length of the second twine 84 used per each bale 24 is dependent upon the bale length 28 of the bale 24 and a knot length of the second twine 84 used in each of the first knot 90 and the second knot 92 respectively. The knot length is generally a constant length of the second twine 84, and may be defined and saved in the memory 102 of the controller. The used length of the second twine 84 may therefore be equal to the sum of the bale length 28 of the bale 24, the knot length of the second twine 84 of the first knot 90, and the knot length of the second twine 84 of the second knot 92.

Once the knotter controller 98 has estimated the used length of the second twine 84, as described above, the knotter controller 98 may then determine a remaining length of the second twine 84 in the second twine supply 80. The step of determining the remaining length of the first twine 82 and the second twine 84 is generally indicated by box 148 shown in FIG. 6. For example, the knotter controller 98 may subtract the used length of the second twine 84 from the initial length of the second twine 84 to determine the remaining length of the second twine 84 in the second twine supply 80. Because the used length of the second twine 84 is dependent upon the bale length 28 of the bale 24, the knot length of the second twine 84 in the first knot 90, and the knot length of the second twine 84 in the second knot 92, it should be appreciated that the remaining length of the second twine 84 is determined based on the bale length 28 of the bale 24, the knot length of the second twine 84 in the first knot 90, and the knot length of the second twine 84 in the second knot 92.

Once the knotter controller 98 has determined the remaining length of the first twine 82 in the first wine supply and the remaining length of the second twine 84 in the second twine supply 80, the knotter controller 98 may then communicate an output signal to an output device 106. The step of communicating the output signal is generally indicated by box 150 shown in FIG. 6. The output signal may indicate the remaining length of the first twine 82 in the first twine supply 78 and the remaining length of the second twine 84 in the second twine supply 80. The output device 106 may include, but is not limited to, a visual or audio display. For example, the output signal may include an electronic signal to a visual display. The visual display may present text or symbols, to the operator, indicating the remaining length of the first twine 82 in the first wine supply and the remaining length of the second twine 84 in the second twine supply 80. It should be appreciated that the output device 106 may differ from the example implementation described herein, and that the output signal is dependent upon the configuration and operation of the output device 106. The operator may receive the communication from the output device 106, and based on the remaining length of the first twine 82 in the first twine supply 78 and the remaining length of the second twine 84 in the second twine supply 80 decide when to replenish either the first twine supply 78 and/or the second twine supply 80.

Once the remaining length of the first twine 82 and the remaining length of the second twine 84 have been calculated for a respective bale 24, the knotter controller 98 may then calculate an estimated remaining number of bales that may be tied and/or secured based on the remaining length of the first twine 82 and the remaining length of the second twine 84. The step of calculating the estimated remaining number of bales is generally indicated by box 152 shown in FIG. 6. For example, if a desired bale length is saved in the memory 102 of the controller, the desired bale length may be used to estimate the bale length 28 of the bale 24. The desired bale length may be used in combination with the bale width 44 and the bale height 42 of the bale 24 and/or the baling chamber 54 defined and saved in the memory 102 of the knotter controller 98 to estimate the first length 86 of the first twine 82 and the second length 88 of the second twine 84 used per bale 24.

Figure 6:
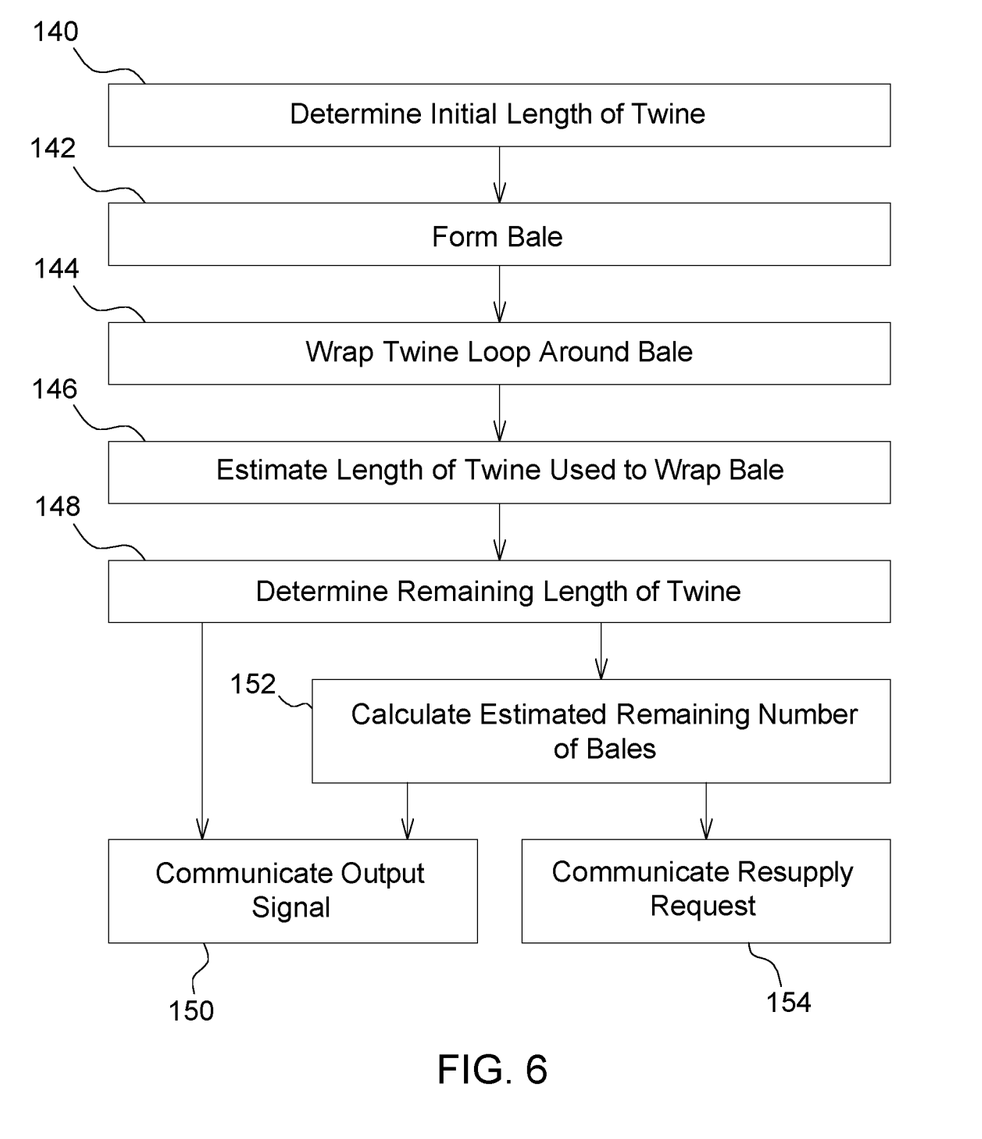
FIG. 6 is a flow diagram representing a method of controlling the baler implement.

For example, the remaining length of the first twine 82 may be divided by the estimated first length 86 of the first twine 82 used per each bale 24 to calculate how many bales 24 may be tied with the remaining length of the first twine 82. The remaining length of the second twine 84 may be divided by the estimated second length 88 of the second twine 84 used per each bale 24 to calculate how many bales 24 may be tied with the remaining length of the second twine 84. The lower of the number of bales 24 that may be tied with the first twine 82 or the number of bales 24 that may be tied with the second twine 84 may be defined as the estimated remaining number of bales 24 that may be secured with the remaining length of the first twine 82 and the remaining length of the second twine 84.

Once the knotter controller 98 has calculated the estimated remaining number of bales 24 that may be secured with the remaining length of the first twine 82 and the remaining length of the second twine 84, the knotter controller 98 may then communicate an output signal to the output device 106. The step of communicating the output signal is generally indicated by box 150 shown in FIG. 6. The output signal indicates the estimated remaining number of bales 24 that may be secured with the remaining first twine 82 and the remaining second twine 84. The output device 106 may include, but is not limited to, a visual or audio display. For example, the output signal may include an electronic signal to a visual display. The visual display may present text or symbols, to the operator, indicating the remaining number of bales 24. It should be appreciated that the output device 106 may differ from the example implementation described herein, and that the output signal is dependent upon the configuration and operation of the output device 106. The operator may receive the communication from the output device 106, and based on the estimated remaining number of bales 24 that may be secured decide when to replenish either the first twine supply 78 and/or the second twine supply 80.

The knotter controller 98 may further automatically communicate a resupply request 114 when one of the remaining length of the first twine 82 in the first twine supply 78 is less than a first supply threshold, the remaining length of the second twine 84 in the second twine supply 80 is less than a second supply threshold, or the estimated remaining number of bales 24 is less than a pre-defined bale threshold. The step of communicating the resupply request is generally indicated by box 154 shown in FIG. 6. In one implementation, the resupply request 114 may be communicated to the operator. In another implementation, the resupply request 114 may be communicated to a system manager 108 at a location 110 remote from the baler implement 20. The resupply request 114 may be communicated via a wired or wireless connection, such as but not limited to a cellular signal to a cloud-based network 112 or a mobile handheld device. The system manager 108 may then coordinate resupply of the first twine 82 and the second twine 84 prior to exhausting the first twine supply 78 and/or the second twine supply 80, thereby preventing undesirable downtime of the baler implement 20.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A baler implement comprising:
  a housing defining a baling chamber shaped to form a material into a bale having a parallelepiped shape, wherein the parallelepiped shape of the bale includes a length, a width, and a height;
  a knotter system including a knotter, a first twine supply having a first twine and a second twine supply having a second twine, wherein the knotter is operable to receive the first twine from the first twine supply and the second twine from the second twine supply and tie the first twine and the second twine together to form a knot;
  a knotter controller including a processor and a memory having a twine monitoring algorithm stored thereon, wherein the processor is operable to execute the twine monitoring algorithm to:
    determine a remaining length of the first twine in the first twine supply;
    determine a remaining length of the second twine in the second twine supply;
    calculate an estimated remaining number of bales that are securable based on the remaining length of the first twine and the remaining length of the second twine; and
    communicate an output signal to an output device, wherein the output signal indicates the estimated remaining number of bales that are securable.

2. The baler implement set forth in claim 1, further comprising a bale length sensor operable to generate a length signal indicating the length of the bale.

3. The baler implement set forth in claim 2, wherein the processor is operable to execute the twine monitoring algorithm to determine the remaining length of the first twine in the first twine supply based on the length signal from the bale length sensor.

4. The baler implement set forth in claim 2, wherein the processor is operable to execute the twine monitoring algorithm to determine the remaining length of the second twine in the second twine supply based on the length signal from the bale length sensor.

5. The baler implement set forth in claim 1, wherein the knotter system uses a first length of the first twine and a second length of the second twine to secure the bale, wherein the first length is different than the second length.

6. The baler implement set forth in claim 1, wherein the first twine is positioned adjacent an upper longitudinal side of the bale for the length of the bale, and wherein the second twine is positioned adjacent a rearward end of the bale for the height of the bale, a lower longitudinal side of the bale for the length of the bale, and a forward end of the bale for the height of the bale.

7. The baler implement set forth in claim 1, wherein the processor is operable to execute the twine monitoring algorithm to estimate a used length of the first twine based on the length of the bale.

8. The baler implement set forth in claim 7, wherein the processor is operable to execute the twine monitoring algorithm to subtract the used length of the first twine from an initial length of the first twine to determine the remaining length of the first twine in the first twine supply.

9. The baler implement set forth in claim 7, wherein the processor is operable to execute the twine monitoring algorithm to estimate a used length of the second twine based on the length of the bale.

10. The baler implement set forth in claim 9, wherein the processor is operable to execute the twine monitoring algorithm to subtract the used length of the second twine from an initial length of the second twine to determine the remaining length of the second twine in the second twine supply.

11. The baler implement set forth in claim 1, wherein the processor is operable to execute the twine monitoring algorithm to automatically communicate a resupply request when one of the remaining length of the first twine in the first twine supply is less than a first supply threshold, the remaining length of the second twine in the second twine supply is less than a second supply threshold, or the estimated remaining number of bales is less than a pre-defined bale threshold.

12. The baler implement set forth in claim 11, wherein the processor is operable to execute the twine monitoring algorithm to automatically communicate the resupply request to a system manager at a location remote from the baler implement.

13. The baler implement set forth in claim 1, wherein the processor is operable to execute the twine monitoring algorithm to determine the remaining length of the first twine in the first twine supply based on a knot length of the first twine used per knot tied.

14. The baler implement set forth in claim 13, wherein the processor is operable to execute the twine monitoring algorithm to determine the remaining length of the second twine in the second twine supply based on a knot length of the second twine used per knot tied.

15. A method of controlling a baler implement, the method comprising:
forming a bale in a baling chamber of the baler implement to include a parallelepiped shape having a length, a width, and a height;
wrapping a twine loop around the bale to secure the bale, with a knotter system, wherein the knotter system includes a first twine supply having a first twine and a second twine supply having a second twine, and wherein the knotter system includes a knotter operable to tie the first twine and the second twine together to form a first knot, and wherein the knotter is operable to tie the first twine and the second twine together to form a second knot thereby forming the twine loop around the bale;
determining a remaining length of the first twine in the first twine supply based on a length of the bale;
determining a remaining length of the second twine in the second twine supply based on the length of the bale;
calculating an estimated remaining number of bales that are securable based on the remaining length of the first twine and the remaining length of the second twine; and
communicating an output signal to an output device, wherein the output signal indicates the estimated remaining number of bales that are securable.

16. The method set forth in claim 15, further comprising sensing the length of the bale with a bale length sensor operable to generate a length signal indicating the length of the bale.

17. The method set forth in claim 15, wherein further comprising automatically communicating a resupply request when one of the remaining length of the first twine in the first twine supply is less than a first supply threshold, the remaining length of the second twine in the second twine supply is less than a second supply threshold, or the estimated remaining number of bales is less than a pre-defined bale threshold.

18. The method set forth in claim 17, wherein automatically communicating the resupply request is further defined as automatically communicating the resupply request to a system manager at a location remote from the baler implement.

19. The method set forth in claim 15, further comprising positioning the first twine adjacent an upper longitudinal side of the bale for the length of the bale, and positioning the second twine adjacent a rearward end of the bale for the height of the bale, a lower longitudinal side of the bale for the length of the bale, and a forward end of the bale for the height of the bale.

20. The method set forth in claim 19, wherein determining the remaining length of the second twine in the second twine supply based on the length of the bale is further defined as determining the remaining length of the second twine in the second twine supply based on the length of the bale and the height of the bale.

* * * * *